(12) United States Patent
Beroth

(10) Patent No.: US 6,352,309 B1
(45) Date of Patent: Mar. 5, 2002

(54) PASSENGER SLEEPER SEAT

(75) Inventor: Michael T. Beroth, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 09/483,006

(22) Filed: Jan. 13, 2000

(51) Int. Cl.$^7$ .................................................. B60N 2/02
(52) U.S. Cl. ............... 297/354.13; 297/67; 297/184.14; 297/188.01; 297/284.11; 297/423.41; 297/423.44
(58) Field of Search ......................... 297/354.13, 284.11, 297/423.41, 423.44, 67

(56) References Cited

U.S. PATENT DOCUMENTS

| | | | |
|---|---|---|---|
| 23,581 A | 4/1859 | Jackson | |
| 188,167 A | 3/1877 | Mitchell | |
| 1,131,875 A | 3/1915 | Thompson | |
| 2,320,614 A | * 6/1943 | Kleine | 297/114 |
| 2,583,223 A | * 1/1952 | Mayer | 297/423.15 |
| 2,977,898 A | * 4/1961 | Candlin, Jr. | 105/340 |
| 3,600,037 A | * 8/1971 | Lohr | 297/312 |
| 3,744,843 A | * 7/1973 | Barecki et al. | 297/316 |
| 3,761,124 A | * 9/1973 | Weik et al. | 297/112 |
| 4,324,431 A | * 4/1982 | Murphy et al. | 297/284 |
| 4,664,444 A | * 5/1987 | Murphy | 297/284 |
| 4,685,719 A | * 8/1987 | Hanemaayer | 296/156 |
| 4,991,908 A | * 2/1991 | Krechel | 297/439 |
| 5,308,144 A | 5/1994 | Korn | |
| 5,333,818 A | 8/1994 | Brandt et al. | |
| 5,352,020 A | 10/1994 | Wade et al. | |
| 5,507,555 A | 4/1996 | Kiguchi | |
| 5,553,923 A | 9/1996 | Bilezikjian | |
| 5,567,006 A | * 10/1996 | McCarthy | 297/216.15 |
| 5,628,547 A | 5/1997 | Matsumiya | |
| 5,716,026 A | * 2/1998 | Pascasio et al. | 244/118.6 |
| 5,722,726 A | 3/1998 | Matsumiya | |
| D402,125 S | 12/1998 | Dryburgh | |
| 5,857,745 A | 1/1999 | Matsumiya | |
| D405,275 S | 2/1999 | Dryburgh | |
| 5,954,401 A | 9/1999 | Koch et al. | |
| 5,992,798 A | * 11/1999 | Ferry | 244/118.6 |

FOREIGN PATENT DOCUMENTS

| | | |
|---|---|---|
| EP | 0 523 012 A1 | 1/1993 |
| EP | 0 701 920 A1 | 3/1996 |
| GB | 2 295 962 A | 6/1996 |

* cited by examiner

Primary Examiner—Peter M. Cuomo
Assistant Examiner—Joseph Edell
(74) Attorney, Agent, or Firm—Adams, Schwartz & Evans, P.A.

(57) ABSTRACT

A sleeper seating unit for an aircraft, and including a primary seat having a seat frame for being stationarily-mounted to the aircraft deck, a seat back for being selectively moved by a seat occupant among fully upright, semi-reclined and fully reclined positions, a scat bottom for moving between retracted and extended positions in coordination with the seat back, and an ottoman for being positioned on the deck forward of the primary seat. The ottoman has a top cushion positioned on a top surface thereof and a leg rest cushion positioned on a side of the ottoman facing the primary seat. The leg rest cushion is movable between positions wherein when the primary seat is in an upright position, the leg rest cushion is positioned at an angle to engage and support the bottom of the feet, and when the primary seat is in a reclined position, the leg rest cushion is in a generally horizontal position adjacent to and forming an extension of the seat bottom.

11 Claims, 7 Drawing Sheets

PASSENGER SLEEPER SEAT

TECHNICAL FIELD AND BACKGROUND OF THE INVENTION

This invention relates to a sleeper seat intended for passenger conveyances such as airplanes. The invention disclosed in this application provides a sleeper seat of the type intended to be utilized for long haul, first class passengers. Such types of seats are known, and typically involve a structure which combines a seat back with a seat bottom which has telescoping segments which extend outwardly as the seat back reclines. These extending segments also generally function as leg or foot supports when the seat is in the upright or semi-reclined position. The combined length of the reclined seat back and the extended seat bottom segments are intended to provide a sleeping surface. However, most such arrangements do not provide a flat sleeping surface, but merely one where the seat occupant is allowed to stretch out with the head still substantially above the feet with the body bent slightly at the waist and at the knees. Even with this type of arrangement, significant stress is applied to the leg supports as they telescope outwardly.

One known prior art arrangement, see, U.K. Patent No. 2,326,824, FIGS. 9, 10 and 11, provides a flat resting surface by using a secondary seat forward of the primary seat which forms a support for the feet and lower legs when the primary seat is fully reclined. The system operates by extending the seat bottom and leg rest as the back rest reclines to bridge the space normally existing between the forward end of the primary seat and the secondary seat. The secondary seat is envisaged as one for use by guests whom the occupant of the primary seat may invite to be seated. As is apparent, the secondary seat cannot be used for other purposes, such as a footrest for the occupant of the primary seat or a support for a table or video equipment due to its stationary location well forward of the primary seat.

The application according to this application provides a unique seating arrangement which permits multiple uses of a seating ottoman in an efficient and space-effective manner.

SUMMARY OF THE INVENTION

Therefore, it is an object of the invention to provide a seat which is reclinable to a sleeping position.

It is another object of the invention to provide a seat which utilizes an ottoman positioned in front of the primary seat as a combination foot and leg rest.

It is another object of the invention to provide a seat which utilizes an ottoman which functions as a footrest when the primary seating unit is in an upright position.

It is another object of the invention to provide a seat which utilizes an ottoman as a combination foot and leg rest when the primary seat is in semi-reclined and fully reclined positioned.

It is another object of the invention to provide a seat which utilizes an ottoman as a storage area for the occupant in the primary seat.

These and other objects of the present invention are achieved in the preferred embodiments disclosed below by providing a sleeper seating unit for an aircraft, and comprising a primary seat, including a seat frame for being stationarily-mounted to the aircraft deck, a seat back for being selectively moved by a seat occupant among fully upright, semi-reclined and fully reclined positions, a seat bottom for moving between retracted and extended positions in coordination with the seat back, an ottoman for being positioned on the deck forward of the primary seat, the ottoman having a top cushion positioned on a top surface thereof and a leg rest cushion positioned on a side of the ottoman facing the primary seat, the leg rest cushion movable between positions wherein when the primary seat is in an upright position, the leg rest cushion is positioned at an angle to engage and support the bottom of the feet, and when the primary seat is in a reclined position, the leg rest cushion is in a generally horizontal position adjacent to and forming an extension of the seat bottom.

According to one preferred embodiment of the invention, the ottoman is mounted for fore and aft movement relative to the primary seat.

According to another preferred embodiment of the invention, the leg rest cushion of the ottoman is pivoted for movement between its positions.

According to yet another preferred embodiment of the invention, when the primary seat is in the semi-reclined position the leg rest cushion is elevated above the position of the leg rest cushion when the seat is in the fully reclined position for providing support for the leg behind the knee of the occupant.

According to yet another preferred embodiment of the invention, the primary seat includes a stationary privacy shell enclosing rear and sides of the seat back.

According to yet another preferred embodiment of the invention, the primary seat includes a bolster for supporting the back of the leg and knee of the occupant when in the upright and semi-reclined positions.

According to yet another preferred embodiment of the invention, the bolster is mounted for articulating movement between a support position supporting the back of the leg and knee of the occupant when in the semi-reclined and upright positions and a retracted position below the seat bottom and the adjacent leg rest cushion of the ottoman when the primary seat is in the fully reclined positions.

According to yet another preferred embodiment of the invention, and including motor control means for moving the seat back, seat bottom, ottoman and ottoman leg rest cushion in response to occupant commands.

According to yet another preferred embodiment of the invention, the ottoman is mounted relative to the primary seat whereby the ottoman moves closer to the primary seat as the primary seat reclines and further away from the primary seat as the primary seat moves to its upright position.

According to yet another preferred embodiment of the invention, the leg rest cushion is pivotally-mounted for movement.

According to yet another preferred embodiment of the invention, the ottoman includes therein a storage compartment for storage of the occupant's personal effects, and further wherein the leg support cushion comprises a door for the storage compartment.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 8 is a top plan view of a pair of first class sleeper seats in the dining position.

DESCRIPTION OF THE PREFERRED EMBODIMENTS AND BEST MODE

Figure 1:
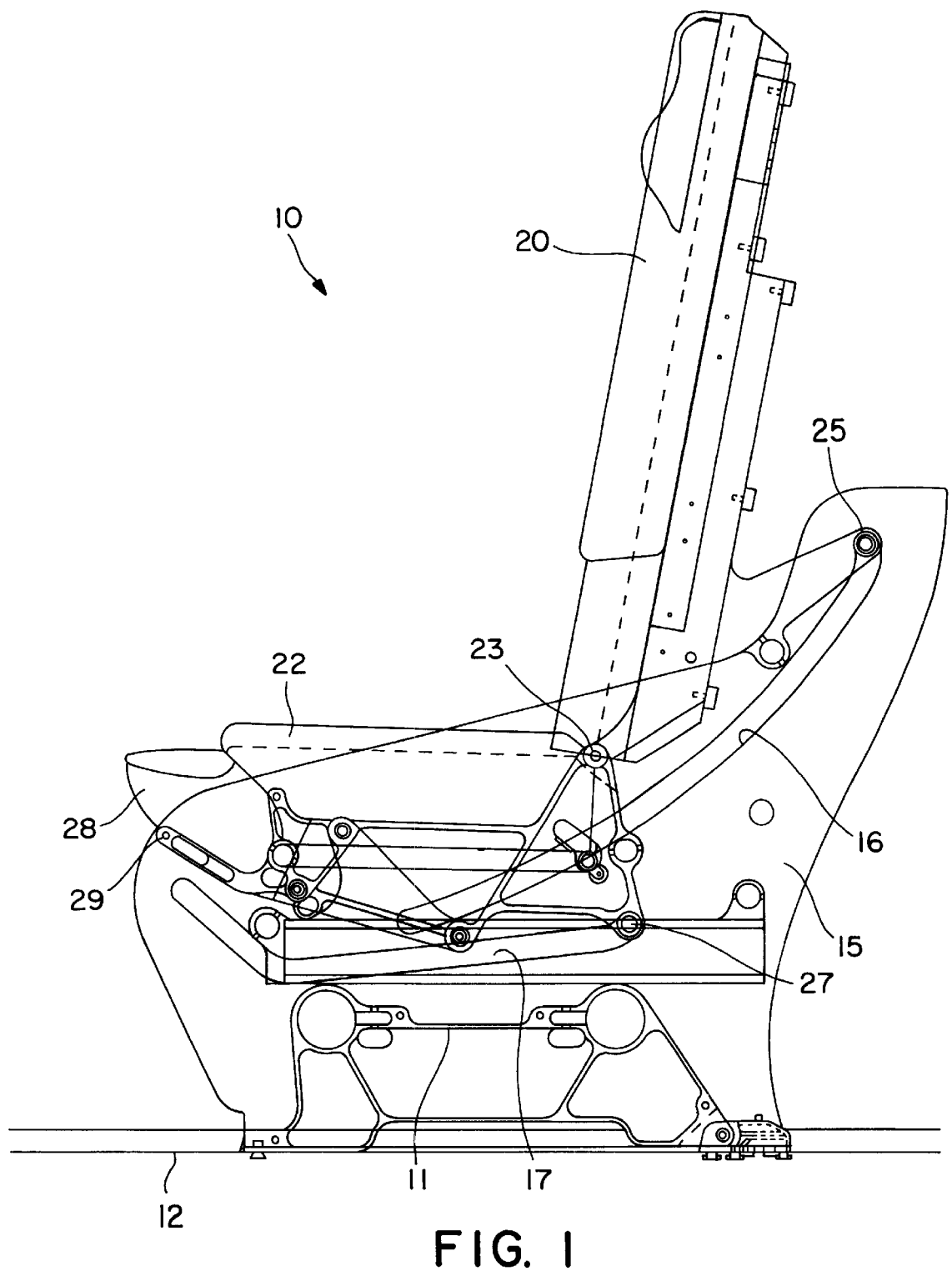
FIG. 1 is a vertical cross-section, with the privacy shell removed for clarity, of a first class sleeper seat according to an embodiment of the invention.

Referring now specifically to the drawings, a first class sleeper seat according to the present invention is illustrated in FIG. 1 and shown generally at reference numeral 10. Seat 10 includes a seat frame 11 which is attached to a track 12 mounted on the deck of an airplane. Attachment is made by use of track fittings, such as those disclosed in applicant's U.S. Pat. No. 5,871,318. The seat frame 11 includes a pair of horizontally spaced-apart side supports 15 in which are formed a pair of elongate guide slots 16, 17. Slots 16, 17 guide movement of a seat back 20 and seat bottom 22, respectively. Seat back 20 and seat bottom 22 are joined for pivotal movement relative to each other by pivot pin 23.

Seat back 20 is mounted between side supports 15 by guide pins 25 mounted for sliding movement in guide slots 16. Likewise, seat bottom 22 is mounted between side supports 15 by guide pins 27. Seat movement occurs by operation of electric motors (not shown) in a conventional manner. The shape of the guide slots 16 and 17 determine the configuration of the seating surface provided for the seat occupant.

Seat 10 also includes an articulating bolster 28 which normally resides forward of the seat bottom 22 and can provide additional support to the back of the leg to taller than normal occupants in the deployed position, as shown, or can be stowed for shorter occupants and when the seat 10 is in the fully reclined sleep position. The bolster 28 moves between these two positions by articulating about a pivot 29 under control of a motor (not shown) during movement among seating positions or, alternatively, by being engaged and pivoted into the stowed position by the front of the seat bottom. In either case, the bolster 28 can be moved independently by the occupant.

Figure 2:
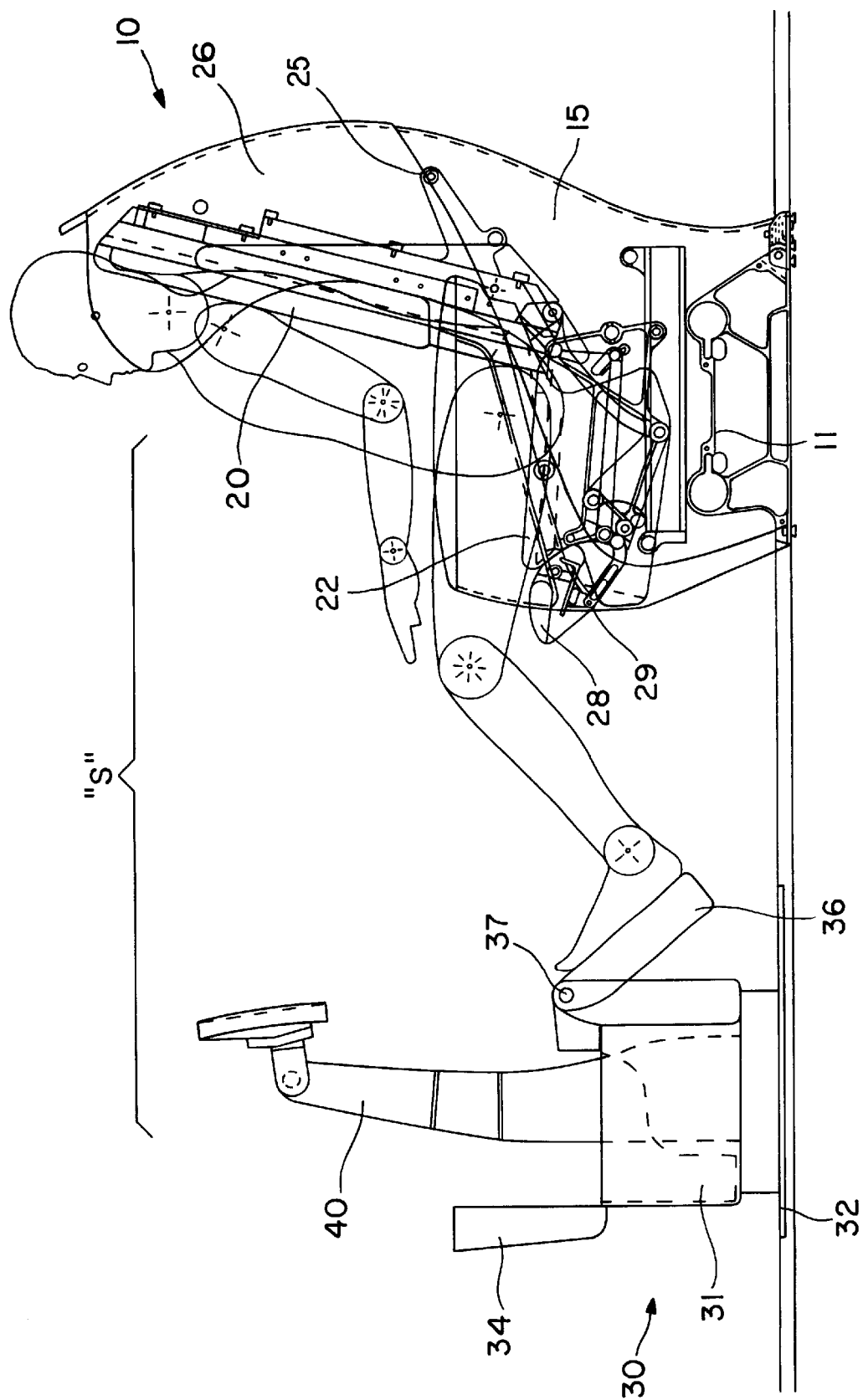
FIG. 2 is a vertical cross-section of the seat shown in FIG. 1 in the fully upright position.

Referring now to FIG. 2, seat 10 includes a privacy shell 26, which encloses the back and sides of the seat back 20. As is shown in FIG. 2, the shell 26 is configured to permit the occupant to see over and around the shell 26 when sitting upright, but to be shielded from view from the sides when in the semi-reclining (FIG. 4) and fully reclined (FIG. 6) positions.

In FIG. 2 and following, seat 10 is shown in combination with an ottoman 30, which function together as a seating unit "S". Seat 10 functions as a primary seat, whereas the ottoman 30 functions secondarily as a foot and leg support, in addition to providing storage for the occupant's personal effects. The ottoman 30 comprises a frame 31 which is mounted on tracks 32 for fore and aft movement, as described below. The ottoman 30 may be used in combination with a pair of stanchions 40 positioned on either side of the ottoman 30, and on which may be carried a video monitor, dining table and the like.

Ottoman 30 also includes a top cushion 34 carried on a top surface of the ottoman 30, and a leg rest cushion 36 mounted on the side of the ottoman 30 facing the seat 10. The leg rest cushion 36 is preferably pivotally-mounted by means of a pivot 37 for movement among different positions, as described below. Preferably, the leg rest cushion 36 is moved by means of a motor (not shown) in a conventional manner. Preferably, movement of the leg rest cushion 36 is coordinated with movement of the seat back 20 and seat back 22, whereby the occupant selects a seating position, and motors move the moveable seating components to the desired position. In accordance with conventional practice, the seating position is selected and operated by controls mounted on seat 10 in a position convenient to the occupant. Preferably, the occupant can also individually control each seating component to a limited extent as desired to adjust the seat to the exact requirements of a particular occupant. Similarly, the occupant can individually move the leg rest cushion 36 of the ottoman 30 to its stowed position flush against the rear-facing side of the ottoman 30, if desired.

FIG. 2 illustrates the seating unit in an fully upright position for landing and takeoff, dining, working and video viewing. The seat 10 and the ottoman 40 are shown in a position whereby the seat occupant is seated upright and the leg rest cushion 36 is deployed to an angle at approximately a 45 degree angle to the vertical. In this position, the support surface of the leg rest cushion 36 is angled to receive and support the feet of the seat occupant, as shown. In the particular embodiment disclosed herein, the ottoman 30 is moved on tracks 32 to a position approximately 32 inches from the front of the seat 10.

Figure 3:
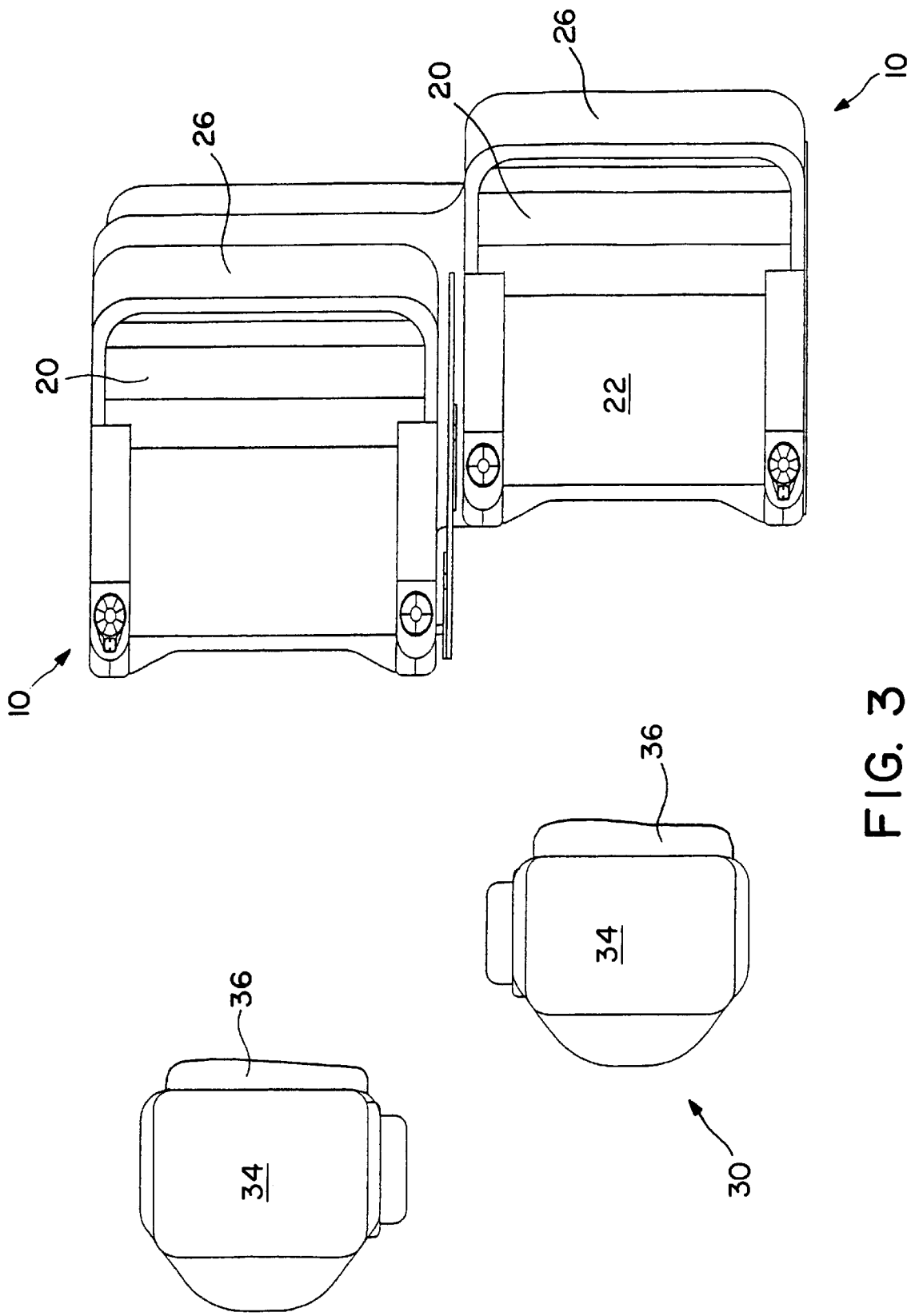
FIG. 3 is a top plan view of a pair of first class sleeper seats in the fully upright position.

This position is also shown in FIG. 3, where is also illustrated the staggered configuration of adjacent seating units "S". This position provides greater privacy for adjacent seat occupants and also permits the "window" seat occupant to leave and return to the seat between the two ottoman 30 without disturbing the "aisle" seat occupant.

Figure 4:
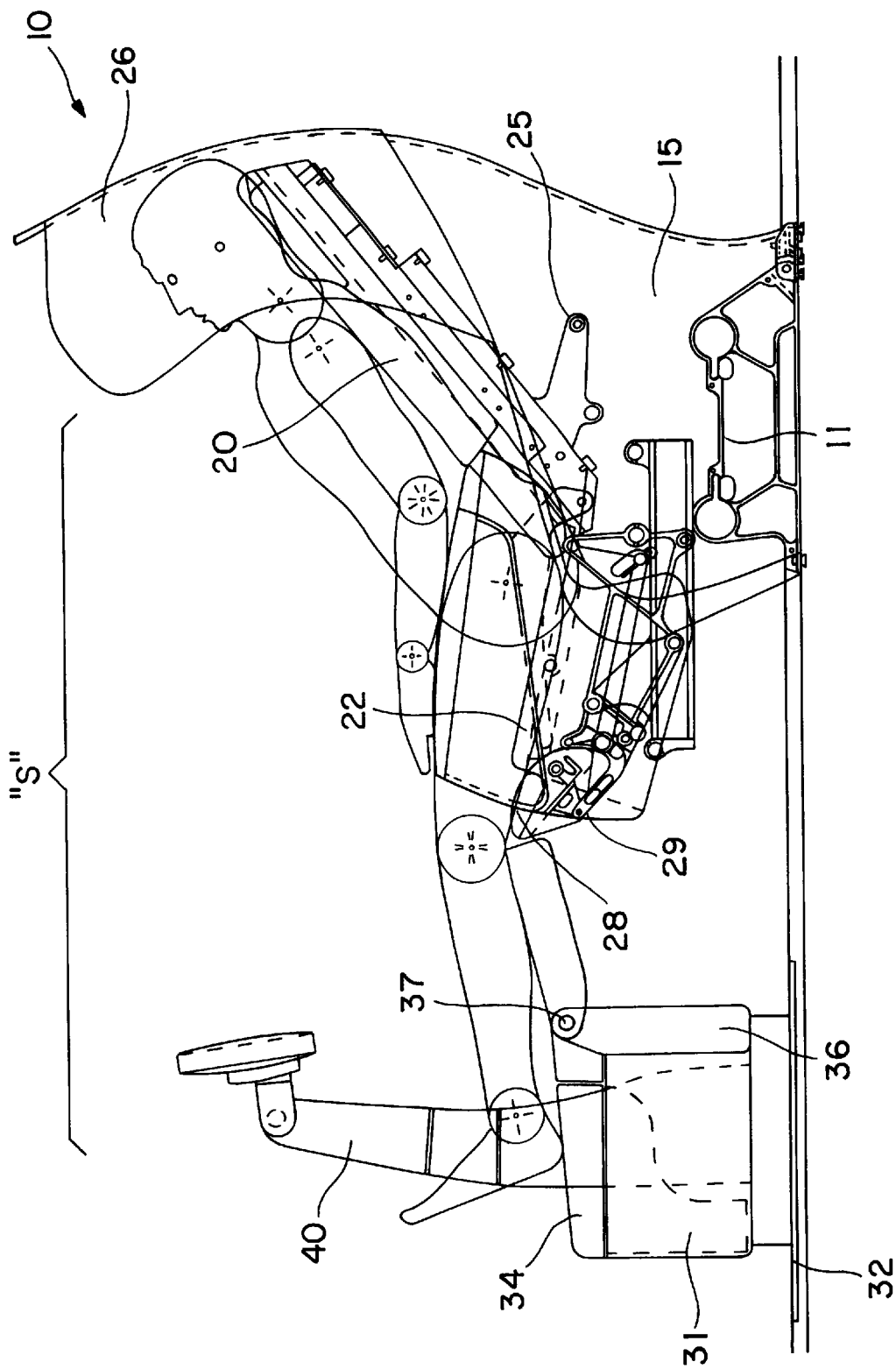
FIG. 4 is a vertical cross-section of the seat shown in FIG. 1 in the semi-reclined, or lounge, position.

Referring now to FIG. 4, seating unit "S" is shown in the semi-reclined lounge position. In this position the occupant is supported along the entire body length. Seat back 20, seat bottom 22 and bolster 28 support the back, thighs and upper leg, as shown. The ottoman 30 has been moved towards the seat 10 by approximately 2.5 inches, and the leg rest cushion 36 as been deployed upwards to a position above the horizontal. The rearward edge of the leg rest cushion 36 either changes or is closely spaced-apart from the outer edge of the bolster 28 and, as shown, supports the lower leg of the occupant, while the feet rest by the heels on the top cushion 34. This position provides a comfortable semi-reclining position with the head elevated above the rest of the body and with the legs comfortably flexed at the knees. See, also, FIG. 4.

Figure 6:
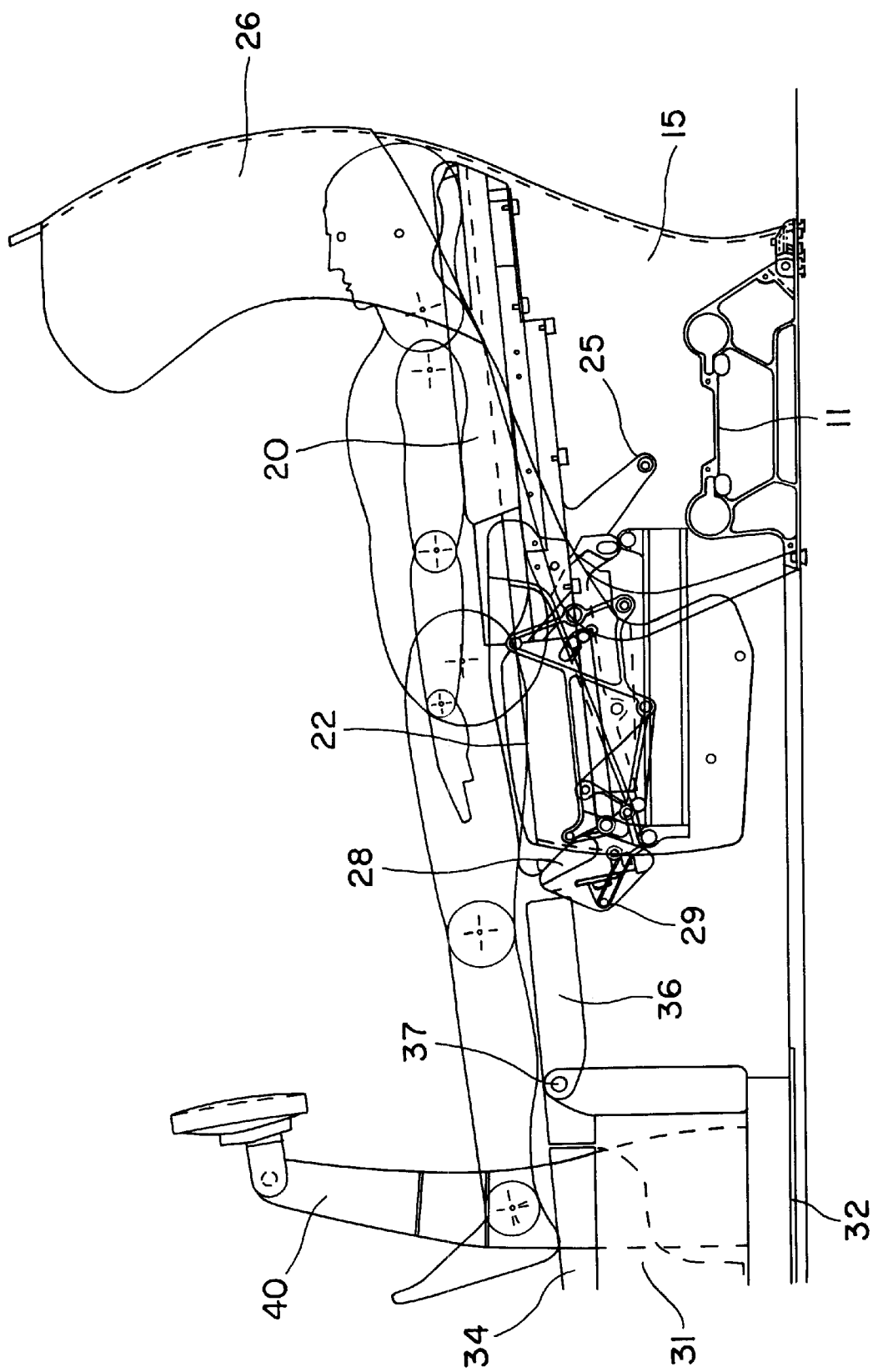
FIG. 6 is a vertical cross-section of the seat shown in FIG. 1 in the fully reclined, or steeping, position.

Referring now to FIG. 6, seating unit "S" is shown in the fully reclined sleep position of approximately 3 degrees above the horizontal. The occupant is permitted to fully recline, with the head only very slightly above the remainder of the body. In this position, the bolster 28 is pivoted downwardly out of contact with the occupant, and the leg rest cushion 36 of the ottoman 30 aligned with plane of the seat back 20, seat bottom 22 and top cushion 34 of the ottoman 30 to collectively form the sleeping surface. Note that the position of the leg rest cushion 36 of the ottoman 30 is slightly lower than in the semi-reclined lounge position shown in FIG. 4, and that the ottoman has removed away from the seat 10 to a distance of approximately 33 inches.

Figure 5:
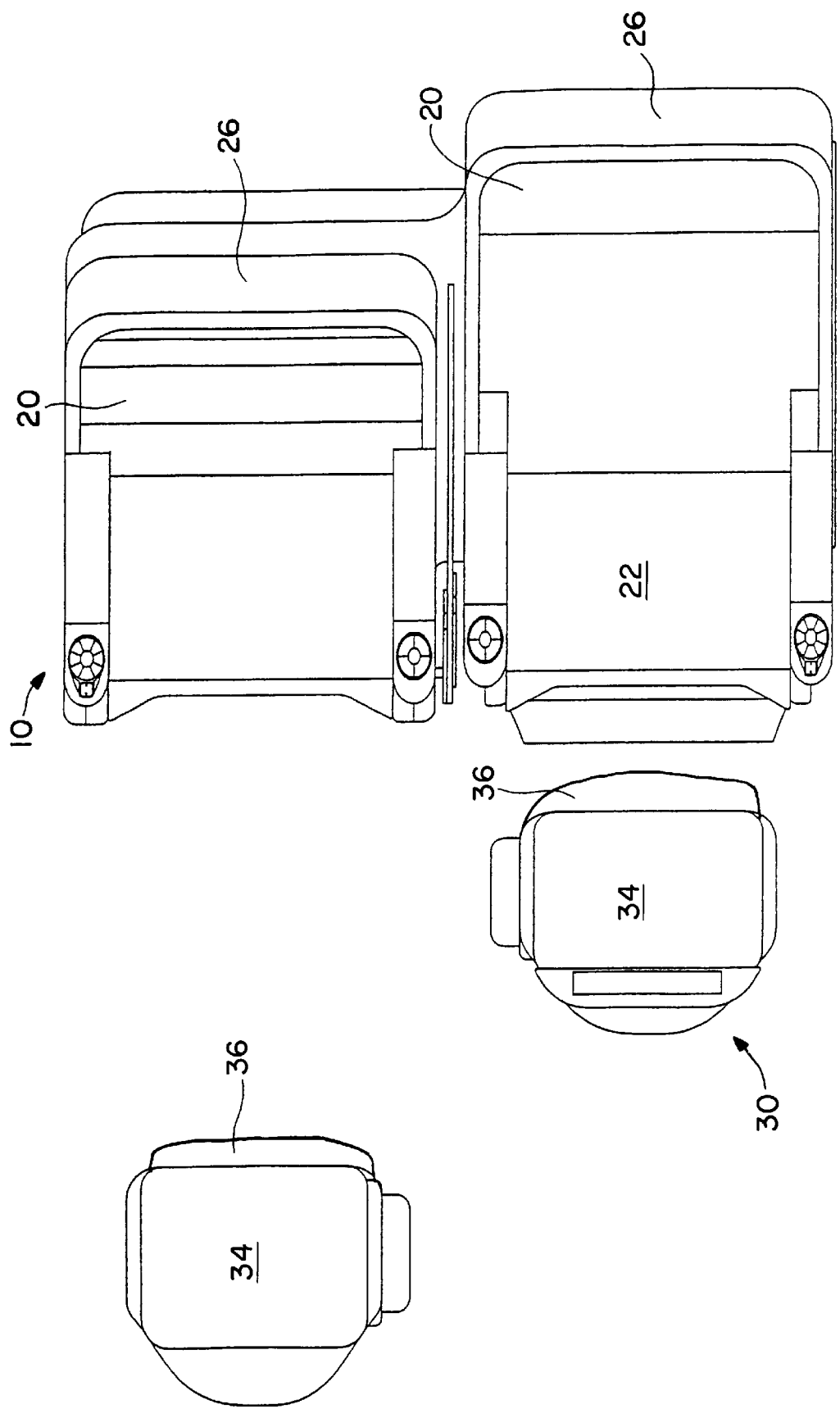
FIG. 5 is a top plan view of a pair of first class sleeper seats with the seat adjacent the aisle in the semi-reclined, or lounge, position.
Figure 7:
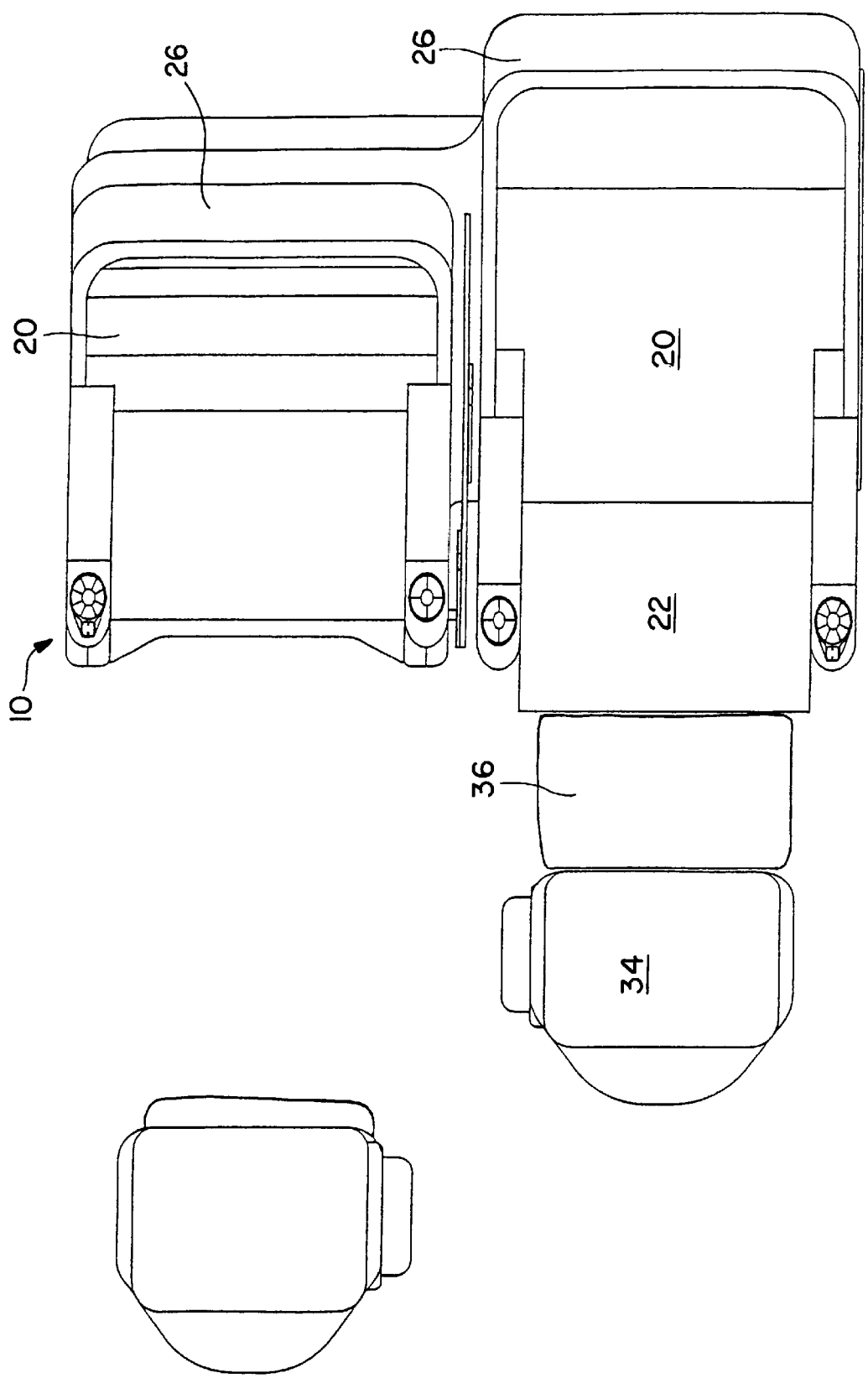
FIG. 7 is a top plan view of a pair of first class sleeper seats with the seat adjacent the aisle in the fully reclined, or sleep, position.

As is shown in FIGS. 5 and 7, the occupant in the aisle seat 10 can lounge in a semi-reclined position (FIG. 5) or sleep in a full reclined position (FIG. 7) while the occupant of the seat 10 adjacent the window can egress/ingress between the two ottoman 36 without disturbing the aisle seat occupant. Similarly, the occupant of the window seat 10 can ingress/egress between the two ottoman 36 while the aisle seat 10 occupant is dining or using the table for work.

A passenger sleeper seat is described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. A sleeper seating unit for an aircraft, and comprising:
   (a) a primary seat, including:
      (i) a seat frame for being stationarily-mounted to the aircraft deck,
      (ii) a scat back for being selectively moved by a seat occupant among fully upright, semi-reclined and fully reclined positions;
      (iii) a seat bottom for moving between retracted and extended positions in coordination with the seat back;
   (b) an ottoman for being positioned on the deck forward of the primary seat, said ottoman having a top cushion positioned on a top surface thereof and a leg rest cushion positioned on a side of said ottoman facing said primary seat;
   (c) said leg rest cushion movable between positions wherein:
      (i) when the primary seat is in an upright position, the leg rest cushion is positioned at an angle to engage and support the bottom of the feet; and
      (ii) when the primary seat is in a reclined position, the leg rest cushion is in a generally horizontal position adjacent to and forming an extension of the seat bottom.

2. A sleeper seating unit according to claim 1, wherein said ottoman is mounted for fore and aft movement relative to said primary seat.

3. A sleeper seating unit according to claim 2, wherein the leg rest cushion of the ottoman is pivoted for movement between its positions.

4. A sleeper seating unit according to claim 1, wherein when the primary seat is in the semi-reclined position, the leg rest cushion is elevated above the position of the leg rest cushion when the seat is in the fully reclined position for providing support for the leg behind the knee of the occupant.

5. A sleeper seating unit according to claim 1, wherein said primary seat includes a stationary privacy shell enclosing rear and sides of the seat back.

6. A sleeper seating unit according to claim 1, wherein said primary seat includes a bolster for supporting the back of the leg and knee of the occupant when in the upright and semi-reclined positions.

7. A sleeper seating unit according to claim 6, wherein the bolster is mounted for articulating movement between a support position supporting the back of the leg and knee of the occupant when in the semi-reclined and upright positions and a retracted position below the seat bottom and the adjacent leg rest cushion of the ottoman when the primary seat is in the fully reclined positions.

8. A sleeper seating unit according to claim 7, and including motor control means for moving the seat back, seat bottom, ottoman and ottoman leg rest cushion in response to occupant commands.

9. A sleeper seating unit according to claim 2, wherein the ottoman is mounted relative to the primary seat whereby the ottoman moves closer to the primary scat as the primary seat reclines and further away from the primary seat as the primary seat moves to its upright position.

10. A sleeper seating unit according to claim 9, wherein said leg rest cushion of the ottoman is pivotally-mounted for movement between stowed, intermediate and raised positions.

11. A sleeper seating unit according to claim 1, wherein said ottoman includes therein a storage compartment for storage of the occupant's personal effects, and further wherein said leg support cushion comprises a door for said storage compartment.

* * * * *